(12) United States Patent
Tippit

(10) Patent No.: US 8,017,249 B2
(45) Date of Patent: Sep. 13, 2011

(54) STARCH-CONTAINING COMPOSITIONS FOR USE IN IMPARTING OIL OR GREASE RESISTANCE TO PAPER

(75) Inventor: Patricia S. Tippit, Decatur, IL (US)

(73) Assignee: Tate & Lyle Ingredients Americas LLC, Decatur, IL (US)

( * ) Notice: Subject to any disclaimer, the term of this patent is extended or adjusted under 35 U.S.C. 154(b) by 149 days.

(21) Appl. No.: 11/964,144

(22) Filed: Dec. 26, 2007

(65) Prior Publication Data

US 2008/0193784 A1    Aug. 14, 2008

Related U.S. Application Data

(60) Provisional application No. 60/889,612, filed on Feb. 13, 2007.

(51) Int. Cl.
*B32B 29/00*    (2006.01)

(52) U.S. Cl. ........ 428/532; 428/533; 428/534; 428/535; 428/536; 428/537.1

(58) Field of Classification Search .......... 428/532–536, 428/537.1
See application file for complete search history.

(56) References Cited

U.S. PATENT DOCUMENTS

| | | | | |
|---|---|---|---|---|
| 2,021,947 A | 11/1935 | Schopp | ............................ | 91/68 |
| 2,304,287 A | 12/1942 | Schur | ............................ | 117/83 |
| 2,317,696 A | 4/1943 | Rich | ............................ | 117/86 |
| 2,661,349 A | 12/1953 | Caldwell et al. | .............. | 260/224 |
| 3,770,685 A | 11/1973 | Uffner et al. | ................ | 260/29.4 |
| 4,035,235 A * | 7/1977 | Richards et al. | ................ | 435/99 |
| 5,505,783 A * | 4/1996 | Fitton | ............................ | 127/65 |
| 5,763,100 A | 6/1998 | Quick et al. | .................. | 428/486 |
| 5,837,383 A | 11/1998 | Wenzel et al. | ................ | 428/486 |
| 5,989,724 A | 11/1999 | Wittosch et al. | .............. | 428/511 |
| 6,372,361 B1 | 4/2002 | Mackewicz et al. | ....... | 428/537.5 |
| 6,521,088 B1 * | 2/2003 | Richardson et al. | .......... | 162/175 |
| 6,528,088 B1 | 3/2003 | Gilleland et al. | .............. | 424/451 |
| 6,548,120 B1 | 4/2003 | Wittosch et al. | .............. | 427/411 |
| 6,649,188 B2 | 11/2003 | Gilleland et al. | .............. | 424/479 |
| 6,790,270 B1 | 9/2004 | Billmers et al. | ............ | 106/145.1 |
| 6,893,686 B2 | 5/2005 | Egan | .............................. | 427/496 |
| 7,019,054 B2 | 3/2006 | Dixit et al. | ..................... | 524/100 |
| 2004/0241475 A1 | 12/2004 | Morabito | ....................... | 428/507 |
| 2005/0008736 A1 | 1/2005 | Egan et al. | ..................... | 426/107 |

FOREIGN PATENT DOCUMENTS

| | | |
|---|---|---|
| CA | 2 467 601 A1 | 11/2004 |
| EP | 0 014 520 | 8/1980 |
| EP | 0 776 767 | 6/1997 |
| EP | 1 149 845 | 10/2001 |
| NL | 6613678 | 3/1967 |
| WO | WO01/92401 | * 12/2001 |
| WO | WO02/14426 | 2/2002 |
| WO | WO02/074814 | 9/2002 |
| WO | WO03/064167 | 8/2003 |
| WO | WO2005/014930 | 2/2005 |
| WO | WO2007/055912 | 5/2007 |

OTHER PUBLICATIONS

Raj et al., *Advances in Polymer Technology* 23(1):32-45 (2004).
Sun, *American Chemical Society*, Chapter 8, pp. 132-146 (2001).
Tate & Lyle Specification Sheet, STA-CAP® 661.
Tate & Lyle Specification Sheet, Mira-Mist 662.
PCT Application No. PCT/US2008/051875 Search Report (May 23, 2008).

* cited by examiner

*Primary Examiner* — Leszek Kiliman
(74) *Attorney, Agent, or Firm* — Williams, Morgan & Amerson, P.C.

(57) ABSTRACT

Herein disclosed is a composition containing a thinned starch having from about 0.1 wt % to about 10 wt % substitution with a hydrophobic substituent wherein, after cooking at from about 15% solids to about 30% solids, the composition has a viscosity of about 1000 cps at 35° C. Also disclosed herein is a paper product containing a substrate containing paper or paperboard and having a first surface and a second surface and a coating applied at least to substantially the entire first surface of the substrate, wherein the coating contains a thinned starch having from about 0.1 wt % to about 10 wt % substitution with a hydrophobic substituent wherein, after cooking at from about 15% solids to about 30% solids, the coating has a viscosity of about 1000 cps at 35° C., wherein the paper product contains from about 5 lb starch to about 500 lb starch per ton of substrate.

17 Claims, No Drawings

STARCH-CONTAINING COMPOSITIONS FOR USE IN IMPARTING OIL OR GREASE RESISTANCE TO PAPER

This application claims priority from U.S. provisional patent application Ser. No. 60/889,612, filed on Feb. 13, 2007, which is incorporated herein by reference.

BACKGROUND OF THE INVENTION

The present invention relates generally to the fields of starch compositions. More particularly, it concerns starch compositions that impart oil or grease resistance when coated on paper products.

Fluorochemicals have been used to impart oil or grease resistance to paper or paperboard used to package oily or greasy foods, such as pet foods, microwaveable popcorn, pizza, fried potatoes, fried vegetables, pastries, chocolate bars, or foods containing oil-based sauces. However, there exist various anxieties regarding possible negative impacts of fluorochemicals on human health or the environment, and at least one major supplier of fluorochemicals exited the market for those reasons.

There exists a need for alternative materials to impart oil or grease resistance to paper or paperboard.

SUMMARY OF THE INVENTION

In one embodiment, the present invention relates to a composition containing a thinned starch having from about 0.1 wt % to about 10 wt % substitution with a hydrophobic substituent wherein, after cooking at from about 15% solids to about 30% solids, the composition has a viscosity of about 1000 cps at 35° C.

In another embodiment, the present invention relates to a paper product containing a substrate containing paper or paperboard and having a first surface and a second surface and a coating applied at least to substantially the entire first surface of the substrate, wherein the coating contains a thinned starch having from about 0.1 wt % to about 10 wt % substitution with a hydrophobic substituent wherein, after cooking at from about 15% solids to about 30% solids, the coating has a viscosity of about 1000 cps at 35° C., wherein the paper product contains from about 5 lb starch to about 500 lb starch per ton of substrate.

DESCRIPTION OF ILLUSTRATIVE EMBODIMENTS

In one embodiment, the present invention relates to a composition containing a thinned starch having from about 0.1 wt % to about 10 wt % substitution with a hydrophobic substituent wherein, after cooking at from about 15% solids to about 30% solids, the composition has a viscosity of about 1000 cps at 35° C.

"Starch," as used herein, encompasses materials known as starches or flours that can come from one or more of a variety of sources, such as corn, wheat, pea, potato, rice, tapioca, and others known in the industry. In one embodiment, the starch has an amylopectin content of at least about 60 wt %. In a further embodiment, waxy starches, having an amylopectin content of at least about 95 wt %, can be used. High amylose starches (having less than about 60 wt % amylopectin) can also be used. Chemically modified starches can be used, as well as amylase-resistant starches. It should be understood that a combination of two or more types of starch can be used.

In one embodiment, the starch is waxy corn starch.

The starch for use in the composition is substituted from about 0.1 wt % to about 10 wt % with a hydrophobic substituent. Substituted with a hydrophobic substituent here refers to esterification of the starch with one or more hydrophobic substituents, which introduces hydrophobic moieties into the starch. In one embodiment, the starch has from about 2 wt % to about 4 wt % substitution with a hydrophobic substituent.

In one embodiment, the hydrophobic substituent is an alkenylsuccinate. In some embodiments of the invention, the alkenyl group of the alkenylsuccinate starch has from about 2 to about 12 carbon atoms. In a further embodiment, the alkenyl group of the alkenylsuccinate starch has from about 6 to about 12 carbon atoms. Octenylsuccinate starch is one suitable example. Such starches are commercially available, for example STA-CAP® 661 starch and Mira-Mist® 662 starch, both available from Tate & Lyle (Decatur, Ill.). Concerning these exemplary starches, STA-CAP 661 has a maximum non-waxy starch content of 7%, a bound octenylsuccinate content from 1.7-2.4%, a free octenylsuccinate content less than 0.3%, and a total octenylsuccinate content less than 3%. Mira-Mist 662 has a maximum non-waxy starch content of 7%. Other starches can be used. In some embodiments of the invention, alkenylsuccinate starch having a relatively high viscosity is preferred.

The "viscosity of about 1000 cps," as used herein, is measured at about 35° C. using an RVA viscometer at 160 rpm (corresponding to a shear rate of about 75 $\sec^{-1}$).

The concentration of starch required to give a cooked paste of about 1000 cps at 35° C. can be modified, either before or after substitution with a hydrophobic substituent, by techniques known in the art, such as acid thinning, among others. The concentration required to give a cooked paste of 1000 cps at 35° C. can be from about 15% solids to about 30% solids. (The percentage of solids is by weight). In one embodiment, the concentration required to give a cooked paste of 1000 cps at 35° C. can be from about 18% to about 28% solids. In a further embodiment, the concentration required to give a cooked paste of 1000 cps at 35° C. can be from about 20% to about 25% solids. It will be apparent to the skilled artisan that, whatever the solids concentration that gives a cooked paste of 1000 cps at 35° C., other solids concentrations within either of the stated ranges may give cooked pastes with higher or lower viscosities at 35° C.

Viscosity testing indirectly measures the weight average molecular weights of starch. The thinner the starch, i.e., the greater the reduction in polymer chain lengths in the starch as a result of the thinning technique, the higher the solids concentration that will be required to attain about 1000 cps viscosity.

In starch handling, starch is frequently present in a mixture with water. The starch can be cooked under conditions and techniques known in the art to hydrate and swell or gel the starch. Typical starch cooking conditions include a temperature from about 80° C. to about 200° C. for a duration from about 5 min to about 60 min. Apparatus that can be used for starch cooking include open kettles or high-pressure jet cookers.

In addition to the hydrophobic-substituted starch, the composition can contain other materials. In one embodiment, the composition also contains water. A non-solid or semi-solid composition containing primarily water and starch can be termed an "aqueous paste." In one embodiment, the composition can be an aqueous paste having from about 5 wt % to about 30 wt % dry solids and a viscosity from about 20 cps to about 300 cps at a temperature from about 50° C. to about 60°

C. In a further embodiment, the aqueous paste can have from about 8 wt % to about 15 wt % dry solids and a viscosity from about 50 cps to about 150 cps at a temperature from about 50° C. to about 60° C. In these embodiments, the viscosity of the aqueous paste at from about 50° C. to about 60° C. is measured by a Brookfield viscometer at 100 rpm.

The composition can contain one or more water soluble gums, such as carageenan, locust bean gum, xanthan, gellan, agar, alginate, guar, gum arabic, or pectin.

The composition can contain organic or inorganic filler or pigment particles, such as clay, calcium carbonate, titanium dioxide, or synthetic organic pigments.

In one embodiment, the composition contains no added protein, sugars, or low-molecular-weight polyols. Protein refers to any pentapeptide or longer peptide. Sugar refers to any mono-, di-, or oligosaccharide having a molecular weight less than 2 kDa. Low-molecular-weight polyols refers to any organic compound having two or more hydroxyl groups and a molecular weight less than 2 kDa. In a further embodiment, the composition can be substantially free of protein, sugars, and low-molecular-weight polyols. "Substantially free" in this context means the composition has less than typical baseline levels of the materials in typical starches, such as about 0.5 wt % of each of protein, sugars, and low-molecular-weight polyols.

In another embodiment, the present invention relates to a paper product containing a substrate containing paper or paperboard and having a first surface and a second surface and a coating applied at least to substantially the entire first surface of the substrate, wherein the coating contains a thinned starch having from about 0.1 wt % to about 10 wt % substitution with a hydrophobic substituent wherein, after cooking at from about 15% solids to about 30% solids, the coating has a viscosity of about 1000 cps at 35° C., wherein the paper product contains from about 5 lb starch to about 500 lb starch per ton of substrate.

Paper and paperboard are known materials. Typical paper known for use in food packaging has weights from about 15 lbs per 3000 square feet to about 190 lbs/3000 square feet, and typical paperboard has a caliper of 0.012 inches or greater. The starch component of the coating can be as described above. The coating can be applied at least to substantially the entire first surface of the substrate by any known technique. Exemplary techniques include, but are not limited to, use of a size press, a tub, a gate roll, a spray applicator, a calendar stack sizer, a blade coater, or a rod coater, among others. The coating can also be applied to part of or substantially the entire second surface of the substrate, if so desired.

In one embodiment, the paper product can be in the form of a package that contains an oily or greasy food, wherein the coating stands between the oily or greasy food and the substrate. Such an arrangement may allow the paper product to resist penetration by oil or grease packaged therein. In one embodiment, the oily or greasy food is selected from the group consisting of pet food, microwaveable popcorn, pizza, fried potatoes, fried vegetables, pastries, chocolate bars, and foods containing an oil-based sauce (for example, a sauce based on cream, vegetable oil, butter, or lard, among other materials).

In one embodiment, the coating imparts to the paper product a grease resistance of at least 4 in the 3M Kit Test known in the art and discussed in more detail in the examples below. In a further embodiment, the coating imparts to the paper product a grease resistance of at least 5 in the 3M Kit Test. In still a further embodiment, the coating imparts to the paper product a grease resistance of at least 6 in the 3M Kit Test.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Experimental Methods

Starches Used

Starches used were Sta Mist 7415 (Tate & Lyle, Decatur, Ill.), acid-thinned waxy corn starch substituted with 2% octenyl succinate; acid-thinned potato starch, 5% hydroxypropylated; Ethylex 2065 (Tate & Lyle, Decatur, Ill.), acid-thinned dent corn starch, 2% hydroxyethylated, plus fructose; Ethylex 2025 (Tate & Lyle, Decatur, Ill.), acid-thinned dent corn starch, 2% hydroxyethylated, plus fructose; Koldex 50 (Tate & Lyle, Decatur, Ill.), dent dextrin; and Electra 7458 (Tate & Lyle, Decatur, Ill.), acid-thinned cationic waxy corn starch.

Concentration of Starch for 1000 cps Viscosity Procedure

The starches were cooked at various solids concentration. The cooking profile specified an initial 35° C. hold for 1 minute, heating from 35° C. to 95° C. over the course of 4 minutes, maintaining 95° C. for 7 minutes, cooling to 35° C. over the course of 2 minutes, and stirring at 35° C. for 7 additional minutes. Agitation was by stirring paddle at a constant 160 rpm (corresponding to a shear rate of about 75 sec$^{-1}$ as measured by a Rapid Visco Analyzer (Newport Scientific, Jessup, Md.)) throughout and viscosity measured throughout the entire test. The reported viscosity was at the end of the test (35° C.).

Solids were selected to give a viscosity between 500 and 1000 cps and a viscosity between 1000 and 1500 cps. We interpolated this data, to estimate the solids that should be necessary to achieve about 1000 cps. This solids estimate was confirmed with a subsequent cook.

Cooking Procedure

Starches were cooked at known solids levels in deionized water. For each starch solids levels were selected to give cooked Brookfield viscosity of no more than 150 cps at 140° F., 100 rpm. Starches were cooked in a boiling-water bath gang stirrer for 60 minutes. At the end of 60 minutes, the temperature of the gang stirrer was adjusted to 155° F. Starch pastes were removed from the gang stirrer, one at a time. Water lost during cooking was added to each starch solution. The beaker containing the starch solution was placed in a 10° C. water bath and the starch was stirred by hand with a thermometer until the temperature of the starch was 140° F. The Brookfield viscosity of the starch was measured at 140° F., 100 rpm. The lowest Brookfield spindle number that gives a reading between 15-85% full scale was chosen, generally a #2 spindle.

Sizing Procedure

After viscosity measurement starch solutions were immediately poured into a glass Pyrex pan, approximately 10 inches×6 inches. Sheets of paper (International Paper, Camden, Ark.) that had been cut to 5.5 inches by 4.25 inches, conditioned overnight at 25° C., 50% relative humidity and preweighed, were submerged in the starch solution for 60 seconds. After 60 seconds the paper was placed in the nip of a two-roll, hand crank wringer, to remove excess starch. Sized sheets were stacked between paper towels until all sheets had been sized.

Drying Procedure

Wet sheets of paper were dried on a rotary dryer (hand sheet dryer) that had first been heated to 235° F. Dried sheets were again conditioned overnight at 25° C., 50% relative humidity prior to re-weighing. Starch pick-up was calculated by the following equation:

$$\frac{\text{sized weight(g)} - \text{unsized weight(g)}}{\text{unsized weight(g)}} \times 2000 = \text{starch pick-up, lbs/ton}$$

3M Test Kit Procedure

Each sheet of paper to be tested was placed on a clean, flat surface, with care taken not to touch the area to be tested. On the test area was dropped, from a height of about 2.5 cm, a drop of test solution with a disposable pipette from an intermediate Kit Number bottle. A stopwatch was started as the drop was applied. After 15 seconds, excess fluid was removed with a clean absorbent paper towel and the wetted area was examined. Failure was evidenced by pronounced darkening of the specimen caused by penetration, even in a small area, under the drop. The procedure was repeated as required, making sure that drops from succeeding Kit Number bottles fell in untouched areas. Results were reported as the Kit Rating, which is the highest numbered solution (1-12) that stood on the surface of the specimen for 15 seconds without causing failure. Fractional values represent the average of multiple tests.

RP2 Oil Penetration Test

Test specimens were placed on a sheet of grease resistant test paper, printed with a test grid containing 100 squares. Test sand was placed on the coated paper. A small amount of oil was applied to the sand. The specimens were placed in a 140° F. oven. Periodically the test specimens were carefully lifted by the corners to evaluate the grease resistant test paper underneath for failure, evidenced by staining. The number of stained squares equals the % failure. The performance of the sheets were assessed by percent failure of the coating to hold-out, from 0 to 100. The papers were tested both flat (Table 2) and creased (Table 3).

Results

Table 1 shows that OS (octenylsuccinate-substituted) waxy starch gives far better 3M Kit Test value than other starch chemistries of similar viscosity and similar pick-ups.

TABLE 1

| Starch | % paste solids | Paste viscosity, cps | Starch pick-up on paper, lb/ton | 3M Kit Test |
|---|---|---|---|---|
| Sta Mist 7415, 2% Octenyl succinate on thinned waxy corn starch | 10 | 21 | 170 | 5.5 |
| Sta Mist 7415, 2% Octenyl succinate on thinned waxy corn starch | 17 | 42 | 275 | 8 |
| Sta Mist 7415, 2% Octenyl succinate on thinned waxy corn starch | 22 | 65 | 308 | 11 |
| Sta Mist 7415, 2% Octenyl succinate on thinned waxy corn starch | 25 | 82 | 389 | 12 |
| 5% hydroxypropyl, acid-thinned potato starch | 10 | 38 | 163 | 1 |
| Ethylex 2065, 2% hydroxyethyl, acid-thinned dent corn starch + fructose | 10 | 40 | 172 | 1.5 |
| Ethylex 2025, 2% hydroxyethyl, acid-thinned dent corn starch + fructose | 15 | 49 | 228 | 0 |
| Koldex 5 dent dextrin | 18 | 50 | 335 | 4 |
| Electra 7458, acid-thinned cationic waxy corn starch | 15 | 57 | 223 | 2 |

Further experiments show that higher molecular weight of the starch, for the same level of OS substitution, improves grease hold-out. Tables 2 and 3 show the performance of OS waxy starches of three molecular weights, applied at various pick-ups, in the RP2 test for oil penetration. The starches used here had 2.7% OS substitution. "Untreated sheet," no starch. "Highly thinned," starch composition with viscosity of about 1000 cps at about 25% solids. "Moderately thinned," starch composition with viscosity of about 1000 cps at about 21% solids. "Lightly thinned," starch composition with viscosity of about 1000 cps at about 18% solids.

TABLE 2

| Base Starch | level of thinning | % octenyl succinate substitution | Starch % Solids | Brookfield Viscosity 100 rpm cps @140 F. | Starch Pickup pound/ton | RP2 % Failure Flat Time, min | | | | | |
|---|---|---|---|---|---|---|---|---|---|---|---|
| | | | | | | 0 | 30 | 60 | 90 | 120 | 1440 |
| untreated sheet | | | | | | 2 | 35 | 43 | 52 | 70 | 100 |
| waxy | highly thinned | 2.7 | 8 | 50 | 116 | 0.2 | 6 | 10 | 19 | 20 | 100 |
| waxy | highly thinned | 2.7 | 10 | 73 | 170 | 0.1 | 7 | 13 | 21 | 25 | 100 |
| waxy | highly thinned | 2.7 | 13 | 98 | 200 | 0 | 0.5 | 3 | 6 | 9 | 100 |
| waxy | moderately thinned | 2.7 | 8 | 122 | 119 | 0.1 | 2 | 4 | 8 | 9 | 70 |
| waxy | moderately thinned | 2.7 | 10 | 165 | 167 | 0 | 2 | 4 | 6 | 6 | 100 |
| waxy | moderately thinned | 2.7 | 13 | 288 | 201 | 0 | 0.1 | 0.1 | 0.1 | 0.1 | 40 |
| waxy | lightly thinned | 2.7 | 8 | 293 | 119 | 0 | 0.1 | 0.1 | 0.1 | 0.5 | 32 |
| waxy | lightly thinned | 2.7 | 10 | 430 | 167 | 0 | 0 | 0 | 0 | 0 | 2 |

TABLE 3

| Base Starch | level of thinning | % octenyl succinate substitution | Starch % Solids | Brookfield Viscosity 100 rpm cps @140 F. | Starch Pickup pound/ton | RP2 % Failure Creased Time, min | | | | | |
|---|---|---|---|---|---|---|---|---|---|---|---|
| | | | | | | 0 | 30 | 60 | 90 | 120 | 1440 |
| untreated sheet | | | | | | 0.1 | 5 | 8 | 10 | 10 | 100 |
| waxy | highly thinned | 2.7 | 8 | 50 | 116 | 1 | 5 | 6 | 8 | 10 | 100 |
| waxy | highly thinned | 2.7 | 10 | 73 | 170 | 3 | 5 | 6 | 7 | 12 | 60 |
| waxy | highly thinned | 2.7 | 13 | 98 | 200 | 0.5 | 2 | 5 | 8 | 8 | 60 |
| waxy | moderately thinned | 2.7 | 8 | 122 | 119 | 3 | 5 | 7 | 10 | 13 | 75 |
| waxy | moderately thinned | 2.7 | 10 | 165 | 167 | 2 | 4 | 6 | 8 | 11 | 70 |
| waxy | moderately thinned | 2.7 | 13 | 288 | 201 | 0.5 | 4 | 7 | 10 | 11 | 60 |
| waxy | lightly thinned | 2.7 | 8 | 293 | 119 | 5 | 7 | 7 | 8 | 13 | 55 |
| waxy | lightly thinned | 2.7 | 10 | 430 | 167 | 3 | 6 | 7 | 7 | 13 | 55 |

Higher levels of OS substitution give improved performance in the 3M Kit Test at comparable starch pickup, as illustrated in Table 4 for Sta Mist 7415 and the low molecular weight starch discussed in Tables 2 and 3.

TABLE 4

| starch | Starch pick-up on paper, lb/ton | 3M Kit Test |
|---|---|---|
| 2.1% OS, acid-thinned waxy corn starch (Sta Mist 7415) | 210 | 2 |
| 2.7% OS, acid-thinned waxy corn starch ("Highly thinned") | 205 | 5 |

All of the compositions and articles disclosed and claimed herein can be made and executed without undue experimentation in light of the present disclosure. While the compositions and methods of this invention have been described in terms of preferred embodiments, it will be apparent to those of skill in the art that variations may be applied to the compositions and articles described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A composition, comprising:
   a non-crosslinked thinned starch having from about 0.1 wt % to about 10 wt % substitution with a hydrophobic substituent,
   wherein, after cooking at from about 15% solids to about 30% solids, the composition has a viscosity of about 1000 cps at 35° C., and
   wherein the composition contains no added protein, sugars, or low-molecular-weight polyols.

2. The composition of claim 1, wherein the starch is waxy corn starch.

3. The composition of claim 1, wherein the starch has from about 2 wt % to about 4 wt % substitution with a hydrophobic substituent.

4. The composition of claim 3, wherein the hydrophobic substituent is an alkenylsuccinate.

5. The composition of claim 4, wherein the alkenylsuccinate is octenylsuccinate.

6. The composition of claim 1, wherein, after cooking at from about 18% solids to about 28% solids, the composition has a viscosity of about 1000 cps at 35° C.

7. The composition of claim 1, further characterized in being an aqueous paste having from about 5 wt % to about 30 wt % dry solids and a viscosity from about 20 cps to about 300 cps at a temperature from about 50° C. to about 60° C.

8. The composition of claim 7, wherein the aqueous paste has from about 8 wt % to about 15 wt % dry solids and a viscosity from about 50 cps to about 150 cps at a temperature from about 50° C. to about 60° C.

9. A paper product, comprising:
   a substrate containing paper or paperboard and having a first surface and a second surface, and
   a coating applied at least to substantially the entire first surface of the substrate, wherein the coating contains a non-crosslinked thinned starch having from about 0.1 wt % to about 10 wt % substitution with a hydrophobic substituent wherein, after cooking at from about 15% solids to about 30% solids, the coating has a viscosity of about 1000 cps at 35° C., wherein the coating contains no added protein, sugars, or low-molecular-weight polyols, and wherein the paper product contains from about 5 lb starch to about 500 lb starch per ton of substrate.

10. The paper product of claim 9, wherein the starch is waxy corn starch.

11. The paper product of claim 9, wherein the starch has from about 2 wt % to about 4 wt % substitution with a hydrophobic substituent.

12. The paper product of claim 11, wherein the hydrophobic substituent is an alkenylsuccinate.

13. The paper product of claim 12, wherein the alkenylsuccinate is octenylsuccinate.

14. The paper product of claim 9, wherein, after cooking at from about 18% solids to about 28% solids, the composition has a viscosity of about 1000 cps at 35° C.

15. The paper product of claim 9, wherein the substrate is paperboard.

16. The paper product of claim 9, wherein the paper product is in the form of a package that contains an oily or greasy food and the coating stands between the oily or greasy food and the substrate.

17. The paper product of claim 16, wherein the oily or greasy food is selected from the group consisting of pet food, microwaveable popcorn, pizza, fried potatoes, fried vegetables, pastries, chocolate bars, and foods containing an oil-based sauce.

* * * * *